United States Patent [19]

Bishay

[11] Patent Number: 5,602,380

[45] Date of Patent: Feb. 11, 1997

[54] BARCODE SCANNER-READER WIRELESS INFRARED LINK

[75] Inventor: Jon M. Bishay, Mukilteo, Wash.

[73] Assignee: Intermec Corporation, Everett, Wash.

[21] Appl. No.: 493,202

[22] Filed: Jun. 20, 1995

Related U.S. Application Data

[63] Continuation of Ser. No. 136,795, Oct. 14, 1993, abandoned.

[51] Int. Cl.$^6$ ........................................................ G06K 7/10
[52] U.S. Cl. ............................................................ 235/472
[58] Field of Search ...................................... 235/462, 472, 235/383; 359/142, 159; 348/211

[56] References Cited

U.S. PATENT DOCUMENTS

| | | | |
|---|---|---|---|
| 4,496,831 | 1/1985 | Swartz | 235/472 |
| 4,837,414 | 6/1989 | Edamula | 219/10.55 |
| 4,841,132 | 6/1989 | Kajitani | 235/472 |
| 4,916,441 | 4/1990 | Gombrich | 341/712 |
| 4,928,179 | 3/1990 | Takahashi | 358/210 |
| 4,945,216 | 7/1990 | Tanabe | 235/462 |
| 5,029,183 | 7/1991 | Tymes | 375/1 |
| 5,073,979 | 12/1991 | Webb | 359/142 |
| 5,157,687 | 10/1992 | Tymes | 235/472 |
| 5,291,325 | 3/1994 | Elliot | 359/142 |

FOREIGN PATENT DOCUMENTS

| | | |
|---|---|---|
| 2397115 | 9/1979 | France . |
| 316399 | 1/1991 | Japan . |
| 456537 | 2/1992 | Japan . |

*Primary Examiner*—Donald T. Hajes
*Assistant Examiner*—Karl D. Frech
*Attorney, Agent, or Firm*—Graham & James LLP

[57] ABSTRACT

A bar code scanner-and-reader system wherein a scanner unit scans the encoded information contained in a selected bar code and transmits the information to a reader unit that displays the decoded information in human or machine readable form where the system has an information transfer link between the scanner and reader units that is a line-of-sight (LOS) infrared (IR) wireless link.

24 Claims, 3 Drawing Sheets

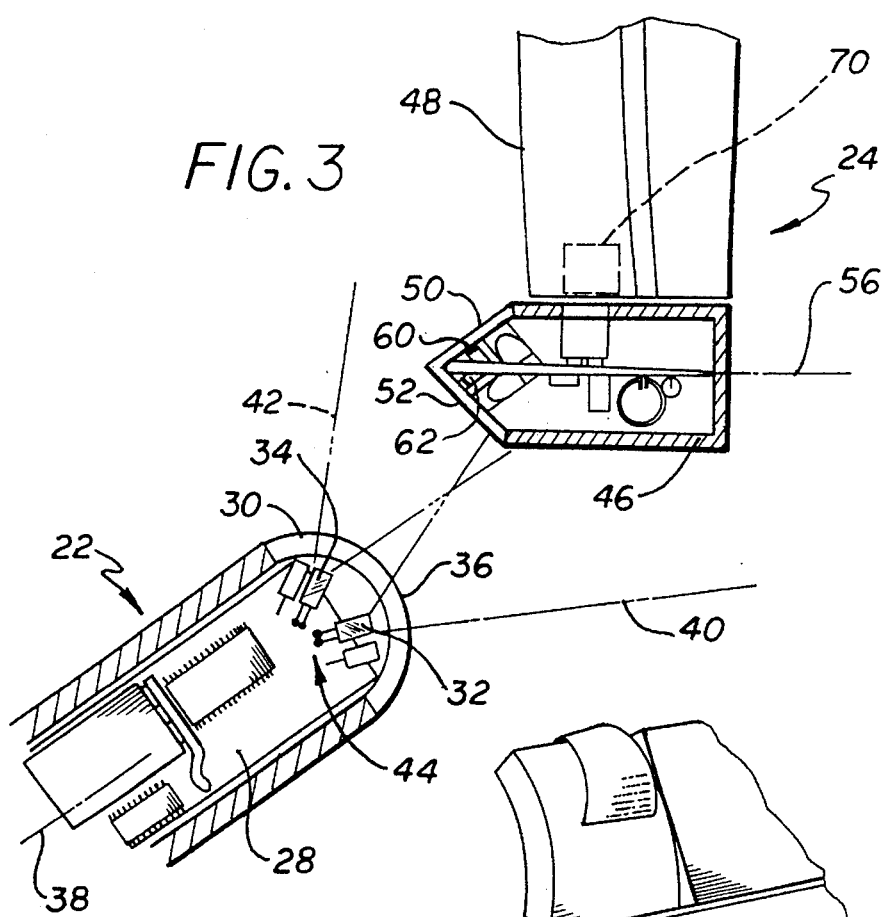
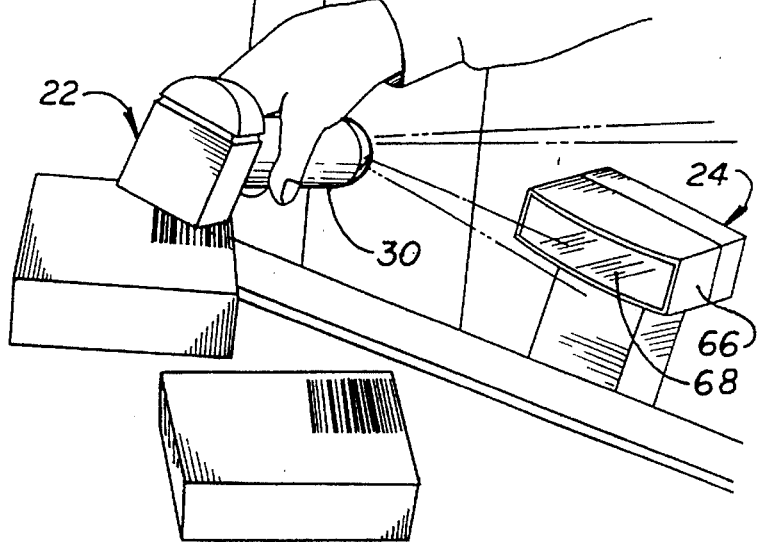

BARCODE SCANNER-READER WIRELESS INFRARED LINK

This is a continuation of application Ser. No. 08/136,795 filed Oct. 14, 1993, now abandoned.

COPYRIGHT MATERIAL

The description of the invention contains material which may be the subject of copyright protection. Reproduction of the patent document as it appears in the United States Patent and Trademark Office is permitted in furtherance of the United States Patent Laws (Title 35 U.S. Code). The copyright owner of this material reserves all other rights under the U.S. Copyright Laws (Title 17 U.S. Code).

BACKGROUND OF THE INVENTION

1. Field of the Invention

A bar code scanner-and-reader system having an infrared (IR) link between the scanner unit and the reader unit, and vice versa.

2. Description of Related Art

Barcodes are everywhere. Their use on nearly everything which has to be identified and tracked is both optional and mandated. From the family supermarket to the super warehouse; from the cradle to the grave, barcodes are an everyday fact of life and of living.

But a bar code alone, all by itself, has little value. It represents information which has value only when it is "read" and "understood". It is like a reference book in a library that must be read and understood before the book has true value.

This reading (actually scanning) of a standard bar code is done using optical bar code scanners, or similar devices, which project a beam of electromagnetic radiation, such as coherent light, across the bar code; then receive the bar code information represented by the pattern of reflected light from the bar code. This reflected pattern is decoded and ultimately translated by a reader unit into human or machine readable information.

Critical to these bar code systems is the link between the scanner unit and the reader unit. Usually this link is an electrically conductive cord or wire very similar to the electrical link between a computer keyboard and the computer tower; itself linked in similar fashion to the computer monitor or screen. In the computer system environment, such a link is not particularly disadvantageous since both the computer equipment and the user are relatively stationary. But with a bar code scanner, the cord link between the scanner unit and the reader unit can be a disadvantage; it is the "weak" link in the scanner-and-reader system that can be damaged or can lose its functional integrity. Also, the possibility of an accident either to a system operator or to the system structure is real when using a bar code scanner unit having a hard wire link to its reader unit. The link can catch on moving or stationary machinery endangering the user and/or the scanner-and-reader system.

Another thctor to consider today is the increased cost of any scanner-and-reader system having a hard link. The requirement for a hard link comes with an associated cost. Elimination of this link would be an advantageous cost reduction which is very beneficial in today's competitive market.

Elimination of this link can also avoid certain government regulatory requirements which can result in a cost savings. For example: a wireless radio transmitter and receiver system could be used to replace the hard link, but a radio signal interconnect would impose a governmental regulatory requirement for certain licenses necessary to legally operate the system.

Elimination of this link without the use of such a radio signal interconnect can also realize a cost savings in lower power requirements to operate the system.

Therefore, there is a continuing need for an improved, cost effective, safe and simple to operate bar code scanner-and-reader system.

OBJECTS OF THE INVENTION

Accordingly, it is an object of the invention to provide a new and improved bar code scanner-and-reader system having a wireless link.

It is an object of the invention to provide a wireless link that has a low power requirement.

It is an object of the invention to provide a wireless link that realizes a reduction in weight of the scanner-and-reader system.

It is an object of the invention to provide a wireless link that does not require licensing by a government regulatory agency or department.

It is an object of the invention to provide a wireless link that results in a lower overall cost for the scanner-and-reader system.

It is an object of the invention to provide a wireless link that results in greater safety for the user because loose cords that could be entrapped in machinery are eliminated from the scanner-reader system.

A thrther object of the invention is a wireless link that provides enhanced productivity by the user due to an increased scanning rate resulting from the removal of loose cords which would otherwise become entangled with the objects that are being scanned.

SUMMARY OF THE INVENTION

Briefly, in accordance with one form of the invention, a bar code scanner-and-reader system is provided having a scanner unit that scans the encoded information contained in a selected bar code and transmits the information to a reader unit across an information transfer link maintained between the scanner and reader units where this transfer link is a line-of-sight (LOS) infrared (IR) wireless link so that the reader unit displays the decoded information in human or machine readable form.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings(s).

BRIEF DESCRIPTION OF THE DRAWING

FIG. 3 is a cross section, partly broken away, of the bar code scanner-and-reader system of FIG. 2.

FIG. 4 is a perspective of another form of the bar code scanner-and-reader system of the invention having a portable, free standing reader unit.

DESCRIPTION OF THE PREFERRED EMBODIMENT(S)

Figure 1:
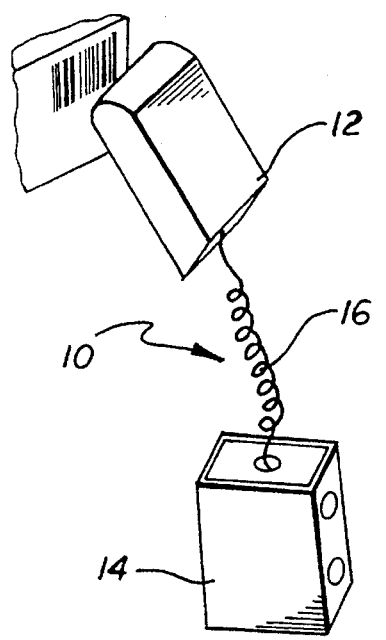
FIG. 1 is a perspective of a PRIOR ART bar code scanner-and-reader system having a hard wire link.

One form of conventional or PRIOR ART bar code scanner-and-reader system 10 is shown by FIG. 1. This PRIOR ART system includes a scanner unit 12 that is linked to a reader unit 14 by a hard wire link 16, which can be a coiled extendable-retractable electrical cord. The scanner unit 12 can be movable, particularly where it is handheld, relative to the reader unit 14 but at all times these units are physically connected together by the flexible, hard link 16. This link 16 constrains the degrees of freedom permitted the scanner unit 12 relative to the reader unit 14. However, this hard link constraint does not include a line-of-sight (LOS) constraint on the physical relationship between the scanner unit 12 and the reader unit 14.

Figure 2:
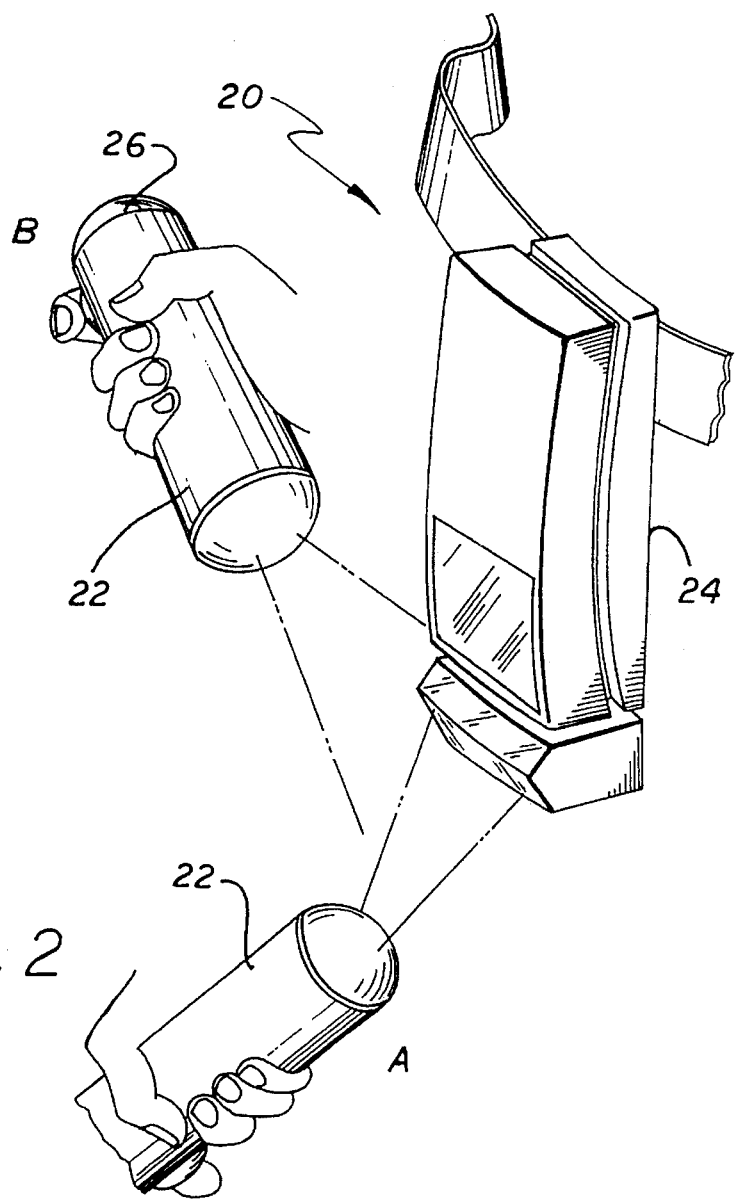
FIG. 2 is a perspective of one form of the bar code scanner-and-reader system of the invention.

Referring now to FIGS. 2 and 3, one preferred embodiment of a new and improved bar code scanner-and-reader system 20 of the invention includes a portable scanner unit 22 that is movable in a LOS positional relationship relative to a quasi-stationary reader unit 24; for example scanner unit 22 can be movable between any one of many LOS positions such as a first position A and a second position B as shown by FIG. 2. There is no PRIOR ART hard link, such as link 16 of the system 10 as shown by FIG. 1. The scanner unit 22 of FIG. 2 is preferably handheld, and therefore portable, while the reader unit 24 can be positioned either in a stationary LOS location relative to the scanner unit 22, or carried by a user of the system 20 in the desired LOS relationship with the scanner unit 22 for proper operation of the system 20. It is contemplated that this LOS relationship can be either a direct or an indirect line (for example, by use of one or more plane or concave mirrors) between the units 22 and 24.

In the bar code scanner-and-reader system 20 of the invention, the scanner unit 22 includes at least three functionally distinct portions: a bar code information input portion 26 that scans the encoded information of a selected bar code; an information processing portion 28 that decodes the bar code information; and, an information transmitter-receiver portion 30 that transmits the bar code information to the receiver unit 24. While the information input and processing portions 26 and 28 are considered to be conventional and part of the PRIOR ART, it is the information transmitter-receiver portion 30 which is new for the scanner-and-reader system 20 of the invention.

The information transmitter-receiver portion 30 has transmitting light emitting diodes (LEDs) patterned for the alphanumeric display and transmittal of information processed by the scanner unit 22. As particularly shown by FIG. 3 the transmitter portion 30 preferably has dual arrays of transmitting LEDs 32 and 34. These LED arrays 32 and 34 are positioned behind and protected by an IR transparent cover (which may be a concave mirror) 36. The LED arrays 32 and 34 are oriented at an angle relative to the longitudinal axis 38 of the scanner unit 22. For example, the dual arrays of LEDs 32 and 34 develop respective dual transmitting cones 40 and 42 (both shown in phantom) where each cone emanates from its LED vertex and includes a determinable active cone or field for LOS operation. It is preferred that each cone 40 and 42 exhibit a relatively small margin of field overlap to eliminate, or at least substantially minimize, any LOS interruptions between the scanner unit 22 and the receiver unit 24. It is contemplated that each of these cones 40 and 42, generated by the respective transmitting LED arrays 32 and 34, could vary from 10 to 50 degrees as conventionally measured. Thus, the dual transmitting cones 40 and 42 allow the LED arrays 32 and 34 directional variability in the manner in which the transmitter portion 30 is oriented. In the preferred embodiment, each cone 40 and 42 is about a 45° cone. This portion 30 of the scanner unit 22 may also have a predetermined array or arrays of receiving diodes, such as diode array 44, also oriented at a selected angle to include one or more sectors relative to the longitudinal axis 38 of the scanner unit 22. The operation of the scanner unit 22 in the bar code scanner-and-receiver system 20 of the invention will be subsequently described.

In the bar code scanner-and-reader system 20 of the invention, the reader unit 24 includes at least two functionally distinct portions: a reader receive module 46, which may also have a send or transmit function; and, a reader processing portion 48 (functionally a CPU) which is considered to be conventional and part of the PRIOR ART. It is the receive module 46 which is new for the scanner-and-reader system 20 of the invention. The reader unit 24 may have a display screen 25 (FIG. 2) which may display both bar code and decoded symbols are text.

The receive module 46 has at least two IR transparent covers 50 and 52 which are oriented at about 60° to the side elevation longitudinal axis 56 of the module. The orientation of the transparent covers 50 and 52 of the receive module 46 allow the LED arrays 32 and 34 to send and receive data from the dual transmitting cones 40 and 42 (associated with LED arrays 32 and 34) which are directional variable in the manner by which such data is received by module 46. The transparent covers 50 and 52 may also serve as planar mirrors. The transmitting LED arrays 32 (which send a light beam by way of one of the dual transmitting cones 40) are associated with and positioned adjacent to the predetermined array or arrays of receiving LED diodes 44 which are directional variable in the manner by which such data is received by module 46. Receiving LED diodes 44 form an array or arrays of IR receiving diodes positioned beneath a single IR transparent cover or surface, as shown in FIG. 3. In the preferred embodiment of FIG. 3, the transmitting arrays 32 and receiving LED diode arrays 44 are positioned adjacent one another to allow the receiving array 44 to receive and interpret reflected light back from the bar code target (not shown) that the transmitting cone 40 from array 32 was directed towards. It is contemplated that the number of IR transparent covers or sunaces can be other than the two as illustrated by FIGS. 2 and 3. It is expected, however, that the number of IR transparent surfaces would be dependent upon the configuration of the scanner unit 22, particularly the functional design of the information transmitter-receiver portion 30, as well as the particular requirement for the bar code scanner-and-reader system 20. An array of receiving diodes 60 and 62, and the associated electronics, are positioned within the receive module 46 of the receiver unit 24 adjacent to each of the respective IR transparent covers or surfaces 50 and 52. In most operating scanner-and-reader systems 20, the receive module 46 will also have the capability of transmitting an appropriate acknowledgment signal back to the scanner unit 22. The information transmitter-receiver portion 30 accepts this incoming signal as confirmation that an earlier IR signal transmission to the receiver unit 24 has been received by the receiver unit. This fact can be then appropriately indicated by the display section (not shown but conventional) of the scanner unit 22.

Operatively, the bar code scanner-and-reader system 20 of the invention depends at all times, except one which will be described subsequently, upon the wireless LOS IR link between the scanner unit 22 and the receiver unit 24.

Referring to FIG. 4, the scanner-and-reader system 20 can be used with the handheld, portable scanner unit 22 and its LOS IR link with the stationary receiver unit 24, which may be portable to other free-standing locations than that illustrated. However in this system as illustrated, the receiver unit 24 is not physically carried by or on the body of a user during system operation as has been described with reference to FIGS. 2 and 3. The information trasmitter-receive portion 30 of the scanner unit 22 is held by the operator of the system 20 and scanned across a particular bar code which is to be read. At all times during this scanning and reading of the selected bar code, the transmitter-receive portion 30 of the scanner unit 22 is maintained in a LOS relationship with the receiver unit 24. Although the system 20 of FIG. 3 has a receive module 66 that is functionally identical with the receive module 46 of FIG. 2, it is structurally different since it has a single IR transparent cover or surface 68. This cover 68 is structurally and functionally similar to either of the IR transparent covers or surfaces 50 and 52 of the receive module 46 as described in the system 20 of FIGS. 2 and 3. However, it is contemplated that the receive module 66 could have dual IR transparent surfaces identical or similar to those of receive module 46.

Figure 5:
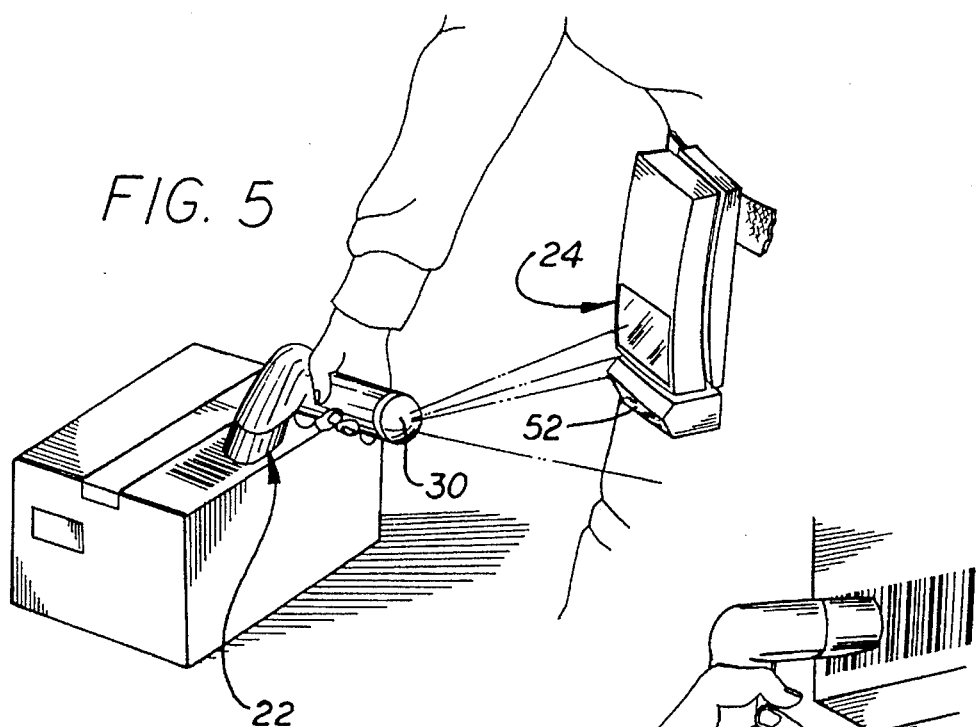
FIG. 5 is a perspective of the bar code scanner-and-reader system of FIG. 2 in one operational mode.
Figure 6:
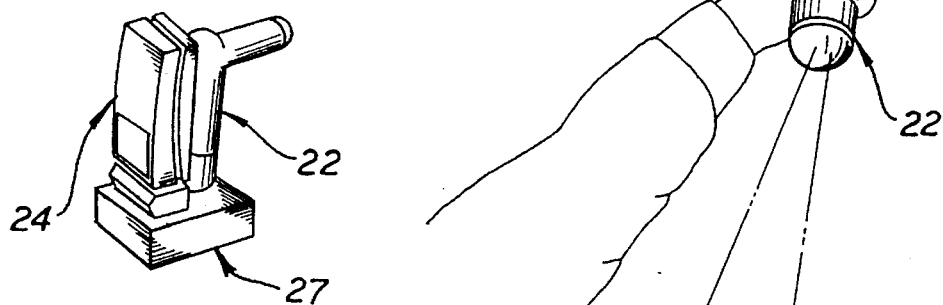
FIG. 6 is a perspective of the bar code scanner-and-reader system of FIG. 2 in another operational mode.

Referring now to FIG. 5, a scanner-and-reader system 20 in accordance with the invention can have a portable, handheld scanner unit 22 that is used in a LOS relationship with a portable, user carried receiver unit 24 as has been described with reference to FIG. 2. The information transmitter-receive portion 30 of the scanner unit transmits an IR wireless signal to the receiver unit 24 and the appropriately oriented IR transparent surface of the receiver module 46. For example, this IR transparent surface could be surface 52 as shown by FIG. 3. But where the user positions the scanner unit 22 in an elevated position to scan a selected bar code as shown by FIG. 6, then it could be expected that IR transparent surface 50 would receive the LOS IR signal from the information transmitter-receive portion 30 of the scanner unit 22. It is contemplated that either the receiver module 46 or its LED arrays 32 and 34, or both, can be movable relative to the reader processing portion 48 of the receiver unit 24, either by a pivot or swivel electrical conductor-connector 70 as shown by FIG. 3, so that the user can appropriately position the selected IR transparent surface to readily accommodate a desired, and critical, LOS orientation between at least the information transmitter-receive portion 30 of the scanner unit 22 and the receiver unit 24.

Figure 7:
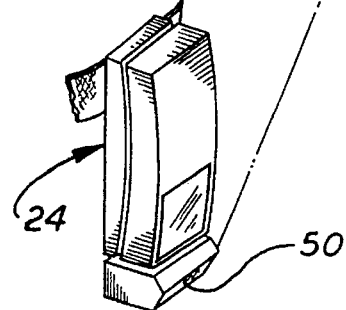
FIG. 7 is a perspective view of a mechanical and electrical linking of the scanning and reader units.

It is also contemplated that when one or more DC batteries (not shown) carried by these units need to be recharged, the scanner unit 22 and the receiver unit 24 can be electrically coupled together through use of a conventional connector so that the locked together units 22 and 24 could find occasional use either as a one-piece scanner-reader (this the one exception as noted above), or more likely find use in recharging the DC batteries by a single, conventional battery charger unit. FIG. 7 shows a perspective view of such a configuration, where the scanner unit 22 and the receiver unit 24 are locked into a battery charging platform 27.

The scanner-and-reader system 20 of the invention in one operating system has a total system weight of about 25 ounces (708 grams) where the scanner unit 22 has a weight of about 14 ounces (397 grams), and with the reader unit 24 having the remainder of the total system weight. Because the system 20 uses an IR wireless link and not a radio link, the scanner unit 22 requires a relatively small rechargeable battery. The reader unit 24 contains the major batteries, CPU, etc. for the bar code scanner-and-reader system 20 of the invention using the IR wireless link as described.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. In a barcode reader having a barcode scanning unit which scans barcodes with a reflected lightbeam connected to a barcode reading unit which receives reflected lightbeam data from the scanning unit and advises the scanning unit to stop scanning when decodable data has been transmitted by the scanning unit and received by the reading unit, apparatus for wirelessly bi-directionally connecting the scanning unit to the reading unit comprising:

a) the scanning unit including a first infrared transmitter/receiver portion having at least one infrared-transmitting diode and at least one infrared-detecting photodiode therein positioned to transmit and receive infrared signals within a first conical area of operability disposed about a first line-of-sight; and, b) the reading unit including a second infrared transmitter/receiver portion having at least one infrared-transmitting diode and at least one infrared-detecting photodiode therein positioned to transmit and receive infrared signals within a second conical area of operability disposed about a second line-of-sight above horizontal and have at least one infrared-transmitting diode and at least one infrared-detecting photodiode therein positioned to transmit and receive infrared signals within a third conical area of operability disposed about a third line-of-sight below horizontal;

wherein, an infrared signal transmitted by said scanning unit within either one of said second and said third conical areas of operability can be received by said reading unit.

2. The apparatus of claim 1 and additionally comprising:

a) a first infrared-transparent cover disposed over said at least one infrared-detecting photodiode of said second infrared transmitter/receiver portion transmitting and receiving infrared signals within said second conical area of operability; and, b) a second infrared-transparent cover disposed over said at least one infrared-detecting photodiode of said second infrared transmitter/receiver portion transmitting and receiving infrared signals within said third conical area of operability.

3. The apparatus of claim 2 wherein:

said first infrared-transparent cover and said second infrared-transparent cover are respectively and alternatingly oriented at about 60° to a side elevation longitudinal axis of said second infrared transmitter/receiver portion.

4. The apparatus of claim 1 and additionally comprising:
means for attaching the reading unit to the body of a user holding the scanning unit.

5. The apparatus of claim 1 and additionally comprising:
a) a first battery disposed in the reading unit for powering the reading unit; and,
b) a second battery disposed in the scanning unit for powering the scanning unit.

6. The apparatus of claim 1 wherein said second infrared transmitter/receiver portion is rotatably coupled to said reading unit permitting rotation of said second infrared transmitter/receiver portion to an optimal position relative to said scanning unit.

7. The apparatus for claim 1 wherein said first infrared transmitter/receiver portion further comprises at least one additional infrared-transmitting diode and at least one additional infrared-detecting photodiode therein positioned to transmit and receive infrared signals within a fourth conical area of operability disposed about a fourth line-of-sight.

8. A barcode reader having a wireless connection between a scanning unit and a reading unit thereof comprising:
a) a barcode scanning unit which scans barcodes with a reflected lightbeam;
b) a barcode reading unit which receives reflected lightbeam data from said scanning unit and advises said scanning unit to stop scanning when decodable data has been transmitted by said scanning unit and received by said reading unit;
c) a first infrared transmitter/receiver operably carried by said scanning unit having at least one infrared-transmitting diode and at least one infrared-detecting photodiode therein positioned to transmit and receive infrared signals within a first conical area of operability disposed about a first line-of-sight; and,
d) a second infrared transmitter/receiver operably carried by said reading unit having at least one infrared-transmitting diode and at least one infrared-detecting photodiode therein positioned to transmit and receive infrared signals within a second conical area of operability disposed about a second line-of-sight above horizontal and having at least one infrared-transmitting diode and at least one infrared-detecting photodiode therein positioned to transmit and receive infrared signals within a third conical area of operability disposed about a third line-of-sight below horizontal;
wherein, an infrared signal transmitted by said first infrared transmitter/receiver of said scanning unit within either one of said second and said third conical areas of operability can be received by said second infrared transmitter/receiver of said reading unit.

9. The apparatus of claim 8 and additionally comprising:
a) a first infrared-transparent cover disposed over said at least one infrared-detecting photodiode of said second infrared transmitter/receiver transmitting and receiving infrared signals within said second conical area of operability; and,
b) a second infrared-transparent cover disposed over said at least one infrared-detecting photodiode of said second infrared transmitter/receiver transmitting and receiving infrared signals within said third conical area of operability.

10. The apparatus of claim 9 wherein:
said first infrared-transparent cover and said second infrared-transparent cover are oriented respectively and alternatingly at about 60° to a side elevation longitudinal axis of said second infrared transmitter/receiver.

11. The apparatus of claim 8 and additionally comprising:
means for attaching said reading unit to the body of a user holding said scanning unit.

12. The apparatus of claim 8 and additionally comprising:
a) a first battery disposed in said reading unit for powering said reading unit and said second infrared transmitter/receiver; and,
b) a second battery disposed in said scanning unit for powering said scanning unit and said first infrared transmitter/receiver.

13. The apparatus of claim 8 wherein said second infrared transmitter/receiver is rotatably coupled to said barcode reading unit permitting rotation of said second infrared transmitter/receiver to an optimal position relative to said barcode scanning unit.

14. The apparatus of claim 8 wherein said first infrared transmitter/receiver further comprises at least one additional infrared-transmitting diode and at least one additional infrared-detecting photodiode therein positioned to transmit and receive infrared signals within a fourth conical area of operability disposed about a fourth line-of-sight.

15. A barcode reader having a wireless connection between a scanning unit and a reading unit thereof comprising:
a) a barcode scanning unit which scans barcodes with a reflected lightbeam;
b) a barcode reading unit which receives reflected lightbeam data from said scanning unit and advises said scanning unit to stop scanning when decodable data has been transmitted by said scanning unit and received by said reading unit;
c) first infrared transmitter/receiver means operably carried by said scanning unit for transmitting and receiving infrared signals within a first conical area of operability disposed about a first line-of-sight; and,
d) second infrared transmitter/receiver means operably carried by said reading unit for transmitting and receiving infrared signals within a second conical area of operability disposed about a second line-of-sight above horizontal and having at least one infrared-transmitting diode and for transmitting and receiving infrared signals within a third conical area of operability disposed about a third line-of-sight below horizontal;
wherein, infrared signals are transmitted between said scanning unit and said reading unit above horizontal by correspondence between said first and second conical areas of operability and infrared signals are transmitted between said scanning unit and said reading unit below horizontal by correspondence between said first and third conical areas of operability.

16. The apparatus of claim 15 wherein:
a) said first infrared transmitter/receiver means includes at least one infrared-transmitting diode and at least one infrared-detecting photodiode therein positioned to transmit and receive infrared signals within said first conical area of operability; and,
b) said second infrared transmitter/receiver means includes at least one infrared-transmitting diode and at least one infrared-detecting photodiode therein positioned to transmit and receive infrared signals within said second conical area of operability and includes at least one infrared-transmitting diode and at least one infrared-detecting photodiode therein positioned to transmit and receive infrared signals within said third conical area of operability.

17. The apparatus of claim 16 and additionally comprising:
   a) a first infrared-transparent cover disposed over said at least one infrared-detecting photodiode of said second infrared transmitter/receiver means transmitting and receiving infrared signals within said second conical area of operability; and,
   b) a second infrared-transparent cover disposed over said at least one infrared-detecting photodiode of said second infrared transmitter/receiver means transmitting and receiving infrared signals within said third conical area of operability.

18. The apparatus of claim 1 wherein:
   said first infrared-transparent cover and said second infrared-transparent cover are oriented respectively and alternatingly at about 60° to a side elevation longitudinal axis of said second infrared transmitter/receiver means.

19. The apparatus of claim 15 and additionally comprising:
   means for attaching said reading unit to the body of a user holding said scanning unit.

20. The apparatus of claim 15 and additionally comprising:
   a) a first battery disposed in said reading unit for powering said reading unit and said second infrared transmitter/receiver means; and,
   b) a second battery disposed in said scanning unit for powering said scanning unit and said first infrared transmitter/receiver means.

21. A portable barcode reader having a wireless connection between a scanning unit and a reading unit thereof comprising:
   a) a barcode scanning unit which scans barcodes with a reflected lightbeam;
   b) a barcode reading unit which receives reflected lightbeam data from said scanning unit and advises said scanning unit to stop scanning when decodable data has been transmitted by said scanning unit and received by said reading unit;
   c) first infrared transmitter/receiver means operably carried by said scanning unit for transmitting and receiving infrared signals within a first conical area of operability disposed about a first line-of-sight;
   d) second infrared transmitter/receiver means operably carried by said reading unit for transmitting and receiving infrared signals within a second conical area of operability disposed about a second line-of-sight above horizontal and having at least one infrared-transmitting diode and for transmitting and receiving infrared signals within a third conical area of operability disposed about a third line-of-sight below horizontal;
   e) means for attaching said reading unit to the body of a user holding said scanning unit;
   f) a first battery disposed in said reading unit for powering said reading unit and said second infrared transmitter/receiver; and,
   g) a second battery disposed in said scanning unit for powering said scanning unit and said first infrared transmitter/receiver;
   wherein, an infrared signal transmitted by said scanning unit can be received by said reading unit and an infrared signal transmitted by said reading unit can be received by said scanning unit by correspondence between said first conical area of operability and one of said second and said third conical areas of operability.

22. The apparatus of claim 21 wherein:
   a) said first infrared transmitter/receiver means includes at least one infrared-transmitting diode and at least one infrared-detecting photodiode therein positioned to transmit and receive infrared signals within said first conical area of operability; and,
   b) said second infrared transmitter/receiver means includes at least one infrared-transmitting diode and at least one infrared-detecting photodiode therein positioned to transmit and receive infrared signals within said second conical area of operability and includes at least one infrared-transmitting diode and at least one infrared-detecting photodiode therein positioned to transmit and receive infrared signals within said third conical area of operability.

23. The apparatus of claim 22 and additionally comprising:
   a) a first infrared-transparent cover disposed over said at least one infrared-detecting photodiode of said second infrared transmitter/receiver means transmitting and receiving infrared signals within said second conical area of operability; and,
   b) a second infrared-transparent cover disposed over said at least one infrared-detecting photodiode of said second infrared transmitter/receiver means transmitting and receiving infrared signals within said third conical area of operability.

24. The apparatus of claim 23 wherein:
   said first infrared-transparent cover and said second infrared-transparent cover are oriented respectively and alternatingly at about 60° to a side elevation longitudinal axis of said second infrared transmitter/receiver.

* * * * *